US009655467B1

(12) United States Patent
Martin

(10) Patent No.: US 9,655,467 B1
(45) Date of Patent: May 23, 2017

(54) PASTA-COOKING DEVICE

(71) Applicant: Benjamin Martin, Mesa, AZ (US)

(72) Inventor: Benjamin Martin, Mesa, AZ (US)

(*) Notice: Subject to any disclaimer, the term of this patent is extended or adjusted under 35 U.S.C. 154(b) by 213 days.

(21) Appl. No.: 14/704,178

(22) Filed: May 5, 2015

(51) Int. Cl.
*A47J 37/08* (2006.01)
*A47J 27/00* (2006.01)
*A47J 37/12* (2006.01)

(52) U.S. Cl.
CPC ........ *A47J 27/004* (2013.01); *A47J 2027/006* (2013.01)

(58) Field of Classification Search
CPC    A47J 27/004; A47J 27/10; A47J 27/18; A47J 37/1257; A47J 37/1271; A47J 2027/006; A47J 2027/008
USPC .................. 99/325–327, 330–336, 339, 403, 99/407–415, 450.2
See application file for complete search history.

(56) References Cited

U.S. PATENT DOCUMENTS

| 4,586,429 | A | * | 5/1986 | Hawkins | G07F 11/70 222/368 |
| 5,275,092 | A | * | 1/1994 | Fauteux | A47J 37/047 220/525 |
| 5,347,917 | A | * | 9/1994 | Vezzani | A47J 27/18 99/335 |
| D362,993 | S | | 10/1995 | Sarnoff | |
| 6,523,457 | B1 | | 2/2003 | Ancona | |
| 6,663,907 | B1 | | 12/2003 | Pratolongo | |
| 7,484,455 | B2 | | 2/2009 | De'Longhi | |
| 7,586,065 | B2 | | 9/2009 | Kehoe | |
| 7,886,656 | B2 | | 2/2011 | Saltini | |
| 7,926,416 | B2 | | 4/2011 | Battani | |
| 2012/0042786 | A1 | * | 2/2012 | Fedell | A47J 27/18 99/356 |

FOREIGN PATENT DOCUMENTS

WO    WO2004/002280    1/2004

* cited by examiner

*Primary Examiner* — Dana Ross
*Assistant Examiner* — Lindsey C Staubach
(74) *Attorney, Agent, or Firm* — Kyle A. Fletcher, Esq.

(57) ABSTRACT

The pasta cooking device is a kitchen appliance that automates the cooking of pasta. Specifically, the pasta cooking device allows users to store all the ingredients for their meals in the pasta cooking device. This allows users to cook the pasta without further intervention.

14 Claims, 5 Drawing Sheets

PASTA-COOKING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cookers and cooking equipment, more specifically, an accessory configured for use in cooking pasta.

SUMMARY OF INVENTION

The pasta cooking device is a kitchen appliance that automates the cooking of pasta. Specifically, the pasta cooking device allows users to store all the ingredients for their meals in the pasta cooking device. This allows users to cook the pasta without further intervention.

These together with additional objects, features and advantages of the pasta cooking device will be readily apparent to those of ordinary skill in the art upon reading the following detailed description of the presently preferred, but nonetheless illustrative, embodiments when taken in conjunction with the accompanying drawings.

In this respect, before explaining the current embodiments of the pasta cooking device in detail, it is to be understood that the pasta cooking device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pasta cooking device.

It is therefore important that the claims be regarded as including such equivalent construction insofar as they do not depart from the spirit and scope of the pasta cooking device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
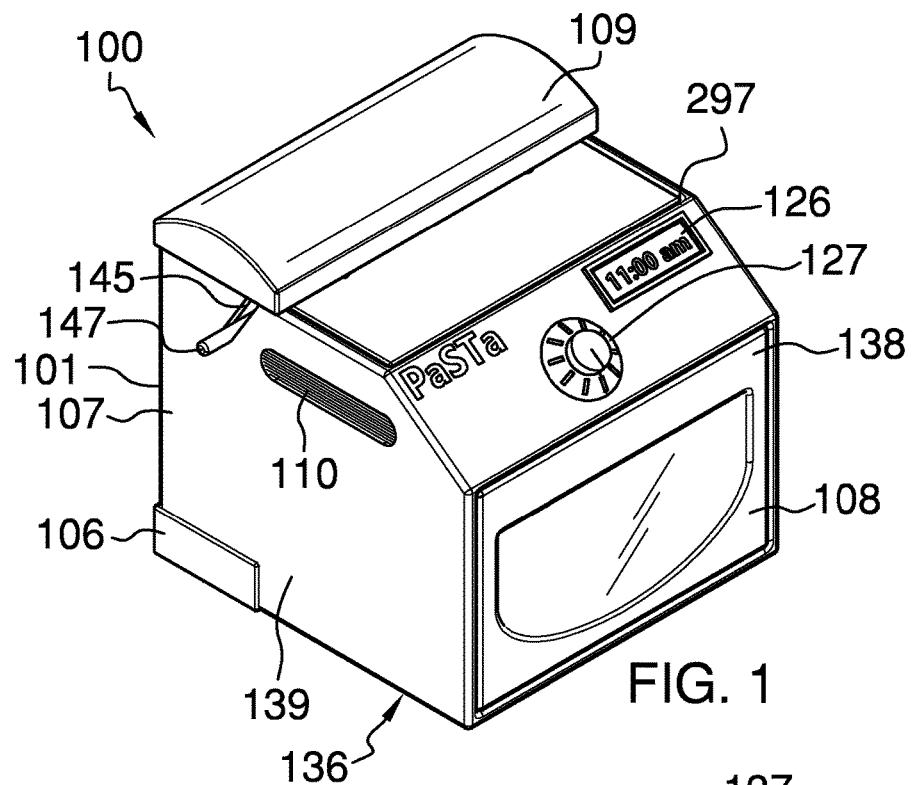
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 8. The pasta-cooking device 100 (hereinafter invention) comprises a housing 101, a hopper 102, a pot dock 104, a pot 105, a water tray 106, a hopper motor 129, a pot dock motor 130, a control system 132, and a power cord 133.

In the specification and claims, the following directional references will be used. A bottom face 136 of the invention 100 rests on a supporting surface. The surface distal from the bottom face 136 is called a top face 137. A front side 138 of the invention 100 contains a main door 108. When looking at the top face 137 of the invention 100, the remaining sides, named clockwise from the front side 138, are a left side 139, a back side 140, and a right side 141. When comparing the relative position of objects associated with the invention 100, the objects take the name of the face or side it is closest to. For example, when a first object and second object are compared, if the first object is nearest the left side 139, then the first object will be the leftmost object or the first object will be to the left of the second object.

It shall be noted that the top face 137 is able to pivot about a top face hinge 297. The top face hinge 297 enables the top face 137 to rotate upwardly in order to provide ease of access to the interior of the invention 100 for cleaning purposes.

The pot dock 104 comprises a power base 112, a lock lever 113, a plurality of stays 114, a first wing 115, a second wing 116, a first bearing, 117, a second bearing 118, and a pot dock handle 119.

The power base 112 is the platform upon which the pot 105 rests. In the center of the power base 112 is a power junction 134 that projects perpendicularly upward from the surface of the power base 112. The purpose of the power junction 134 is to provide power to the heating element 128 in the pot 105. The power junction 134 plugs into a power socket 135 mounted in the bottom face 136 of the pot 105 that provides electricity to the heating element 128.

A first wing 115 is attached to the left side 139 of the power base 112 so that it projects perpendicularly from the power base 112 towards the top face 137 of the invention 100. A second wing 116 is attached to the right side 141 of the power base 112 so that it projects perpendicularly from the power base 112 towards the top face 137 of the invention 100. The first wing 115 is fitted with a first bearing 117 and the second wing 116 is fitted with a second bearing 118.

A first support shaft 142 projects perpendicularly out from left side 139 of the housing 101 towards the right side 141 of the housing 101. A second support shaft 143 projects perpendicularly out from right side 141 of the housing 101 towards the left side 139 of the housing 101. The first support shaft 142 is inserted through the first bearing 117. The second support shaft 143 is inserted through the second bearing 118. The purpose of the first support shaft 142 and the second support shaft 143 is to raise the power base 112 off the bottom surface 136 of the invention 100. The first support shaft 142 and a second support shaft 143 are mounted in the first bearing 117 and the second bearing 118 so that the pot dock 104 can rotate around the pivot point created by the first bearing 117 and the second bearing 118.

A pot dock handle 119 is attached to right side 141 of the power base 112. The pot dock handle 119 is fitted through the pot dock slot 144. The pot dock handle 119 can be used to rotate the pot dock 104 around the pivot point to empty the pot 105 should the pot dock motor 130 fail. Mounted on the top face 137 of the power base 112 is a lock lever 113 and a plurality of stays 114. Each of the plurality of stays 114 are small panels that project perpendicularly from the power base 112 towards the top face 137. The purpose of the plurality of stays 114 is to hold the pot 105 in position while the pot dock 104 rotates. The locking lever 113 is a locking mechanism that locks the pot 105 securely into place after the pot 105 is positioned on the pot dock 104. In a first potential embodiment, illustrated in FIG. 3, the invention 100 is fitted with four stays 114 including the visible first stay 120, second stay 121 and third stay 122 which are visible in FIG. 4.

The power base 112, plurality of stays 114, first wing 115, second wing 116, a first bearing, 117, a second bearing 118, and pot dock handle 119 can be formed as a single unit out of molded plastic or can be made from plastic or metal components. Lock levers and bearings are commercially available. Designs for power junctions are well known and documented in the art and industry (for example electric frying pans or electric kettles).

The pot 105 comprises a container 123, a colander 124 a power socket 135 and a heating element 128. The container 123 is holds the water and pasta while it is being cooked. The bottom 136 of the pot 105 is fitted with a power socket 135 which receives electricity from the power junction 134 and routes the electricity to a heating element 128 that is installed in the bottom 136 of the container 123. When electricity is applied to the heating element 128, the heating element 128 increases temperature, which heats the contents of the container 123. The top 137 of the container 123 is fitted with a colander 124. The colander 124 is a curved surface formed with holes. The concave portion of the surface faces the inside of the container 123. The purpose of the colander 124 is to allow water to be drained into the water tray 106 from the container 123 while keeping the pasta in the container 123.

The container 123 and colander 124 can be made of several metals including, but not limited, cast iron, aluminum, or stainless steel. Heating elements and power sockets are commercially available. Designs for installing power sockets and heating elements in cookware are well known and documented in the art and industry (for example electric frying pans or electric kettles).

The hopper 102 comprises a pasta box 149, first hopper handle 147 and second hopper handle 148. The pasta box 149 is a five sided box that holds the pasta until it is ready to be placed in the pot 105. The pasta box 149 is mounted in two bearings attached to the left 139 side of the housing 101 and the right 141 side of the housing 101 so that it can rotate freely. A first hopper handle 147 is attached to the left 139 side of the pasta box 149 and projects perpendicularly towards the left 139 side of the housing 101. A second hopper handle 148 is attached to the right 141 side of the pasta box 149 and projects perpendicularly towards the right 141 side of the housing 101. The first hopper handle 147 is fitted through the first hopper slot 145 and the second hopper handle 148 is fitted through the second hopper slot 146. The first hopper handle 147 and second hopper handle 148 are used to rotate the hopper 102 around the mounting bearing to empty the pasta box 149 into the pot 105 should the hopper motor 129 fail.

The pasta box 149, first hopper handle 147 and second hopper handle 148 can be molded from food grade plastics including, but not limited to, food grade polyethylene or polycarbonate.

Figure 2:
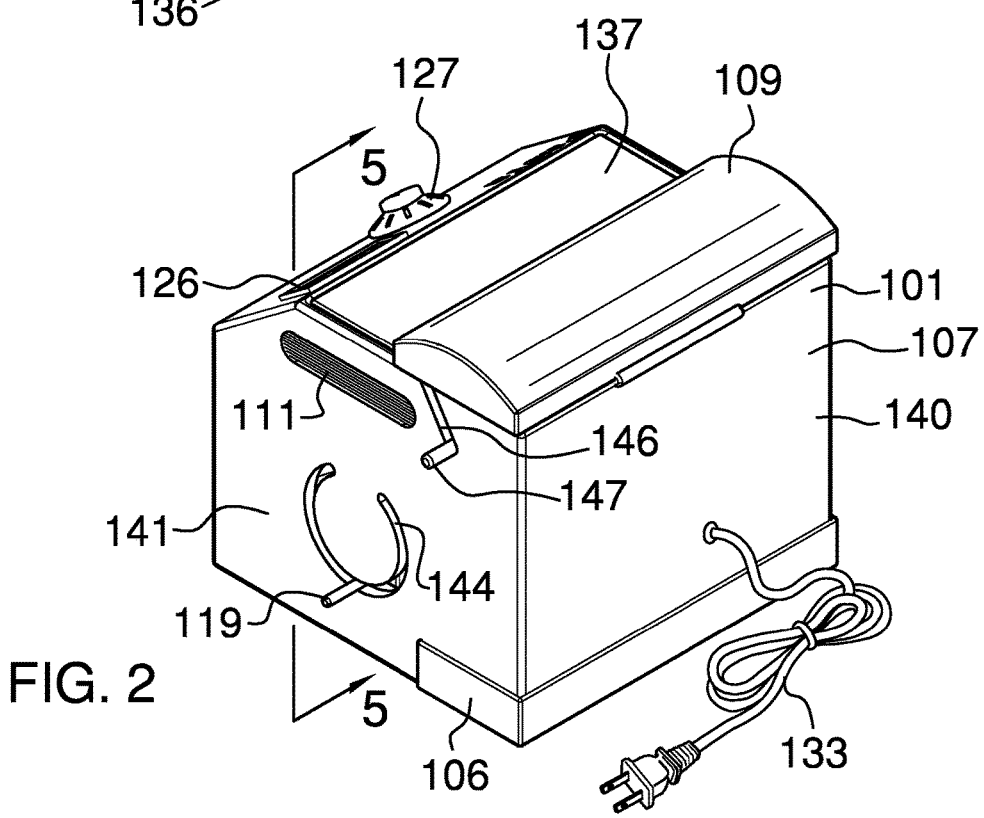
FIG. 2 is an alternate perspective view of an embodiment of the disclosure.
Figure 3:
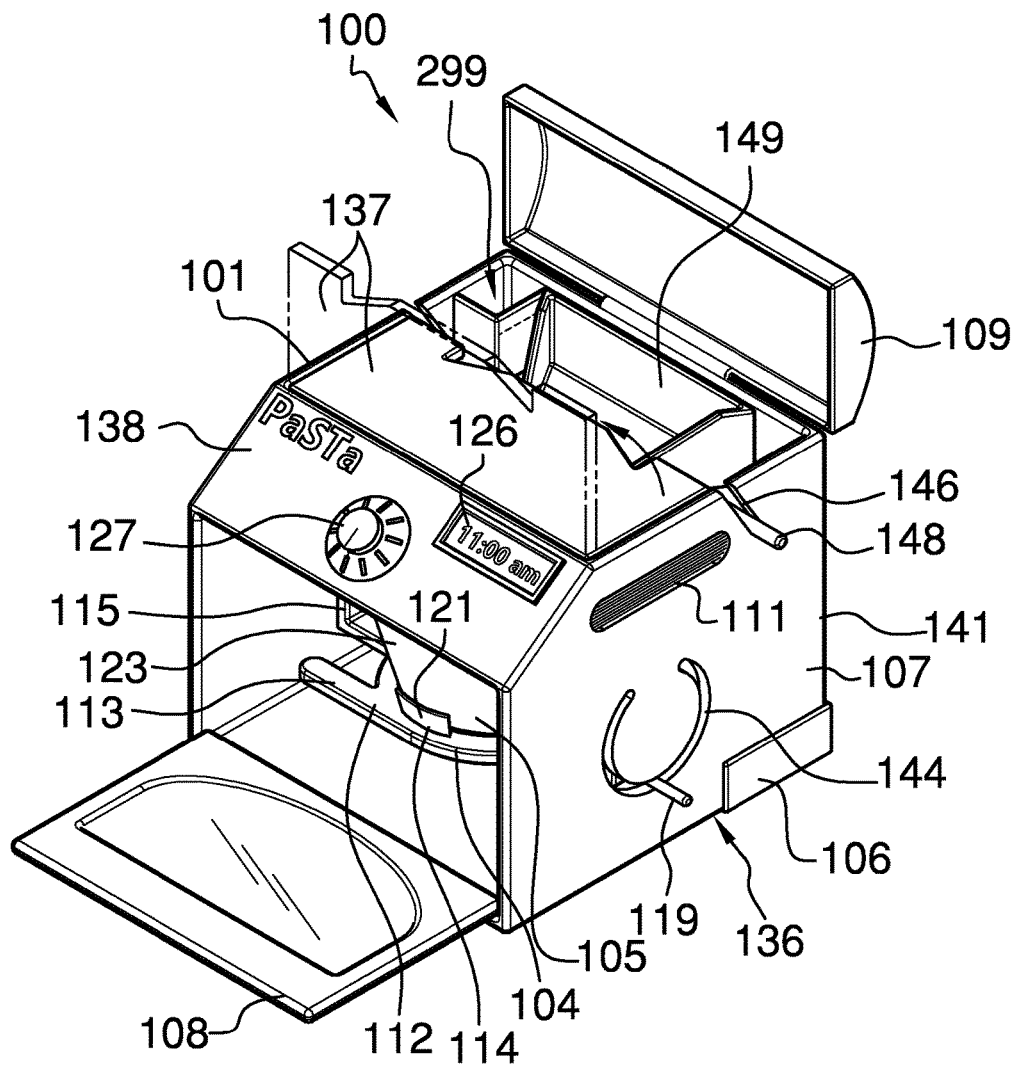
FIG. 3 is an open view of an embodiment of the disclosure.
Figure 4:
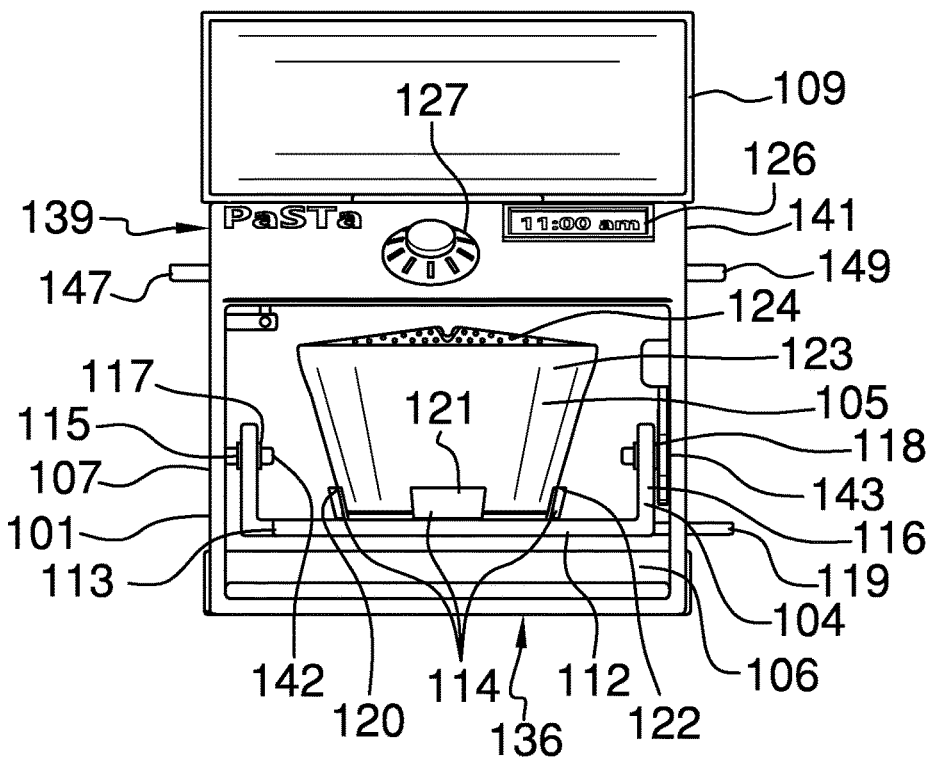
FIG. 4 is a front view of an embodiment of the disclosure.
Figure 5:
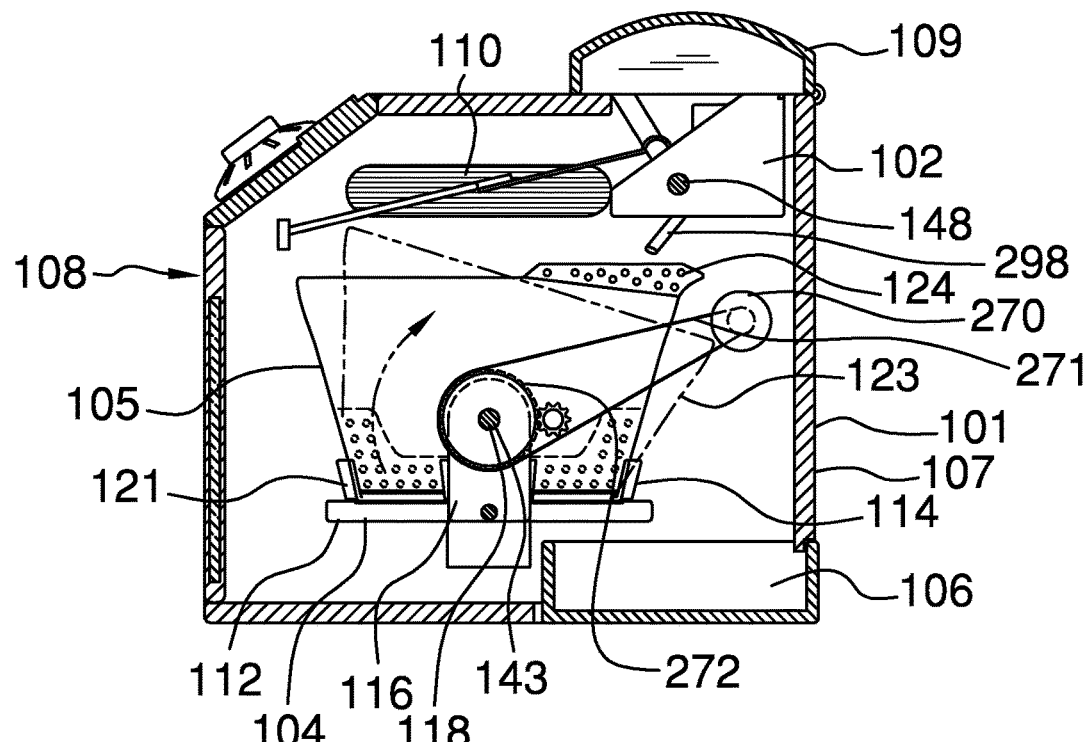
FIG. 5 is a side view of an embodiment of the disclosure.

The water tray 106 is a chamber that holds the water that is poured out of the pot 105. In a second potential embodiment, as illustrated in FIG. 2, the water tray 106 can be slid out of the back 140 of the invention 100. In an third potential embodiment, the water tray 106 can be fitted with a valve and a hose conduct the water to a sink drain.

The water tray 106 can be made from molded plastic. Suitable plastics include, but are not limited to, polycarbonate or polyethylene. Commercially available valves and flexible tubing can be used for the drain and hose.

The housing 101 comprises a shell 107, a main door 108, a hopper door 109, a first vent 110 and a second vent 111, a first support shaft 142 and a second support shaft 143. The shell 107 is a decorative plastic cover that contains all the elements of the invention 100 and that guards the users from injuring themselves during the operation of the invention 100. The main door 108 allows for access to the invention 100 to allow the pot 105 to be removed from the invention 100, filled with water and then returned to the invention 100. The hopper door 109 provides access to the hopper 102 so that it can be loaded with pasta. The first vent 110 and the second vent 111 allow for water vapor and heat to escape from the invention 100 to protect the in invention 100 from overheating. The right 141 side of the housing 101 is formed with a pot dock slot 144. The pot dock slot 144 is a slot formed in the shape of a partial circle of 270 degrees arc. The purpose of the pot dock slot 144 is to provide access to the pot dock 104 should it need to be rotated manually. A first hopper slot 145 is formed in the left 139 side of the housing 101 and a second hopper slot 146 is formed on the right 141 side of the housing 101. The first support shaft 142 and second support shaft 143 are discussed in detail elsewhere in this disclosure.

A dock rotation motor 270 may be included elsewhere inside of the invention 100. The dock rotation motor 270 is connected to a chain 271 that rotates a sprocket 272 in order to rotate the pot dock 104.

The shell 107, main door 108 and hopper door 109 can be made from molded plastic. Suitable plastics include, but are not limited to, polycarbonate or polyethylene. The first vent 110 and second vent 111 are commercially available screens that are mounted in ports formed in the shell 107.

Adjacent the pasta box 149, is a water basin 299. The water basin 299 includes a basin feed tube 298 that extends over top of the pot 105. The basin feed tube 298 is able to dispense water into the pot 105 in order to cook pasta in the pot 105.

External electric power is provided through the use of a commercially available power cord 133.

The control system 132 comprises a master timer 126, a setting timer 127, a hopper motor 129 control, a pot dock motor 130 control, and a temperature measurement device 131. The purpose of the master timer 126 is to set the start time of the invention 100. This allows the invention 100 to be started at some predetermined future time without further intervention by the user. The setting timer 127 is used to set the cooking time of the pasta. Pasta can be cooked to several levels of doneness (for example al dente, super al dente, or soft) depending on the desires of the user. These levels of doneness are controlled by the cooking time which is controlled by the setting timer 127. The temperature measurement device 131 is a device that measures the temperature of the water. This is important for determining when to add the pasta to the water from the hopper 102 and for determining when to begin measuring the cooking time. The hopper motor 129 control is used to rotate the hopper 102 to dump the contents of the hopper 102 into the pot 105. The pot dock motor 130 control is used to rotate the pot dock 104 to empty the water contained in the pot 105 into the water tray 106. The hopper motor 129 and dock pot motor 130 are commercially available. Optionally, the same motor can be used for both the hopper motor 130 and the dock motor 130.

Figure 6:
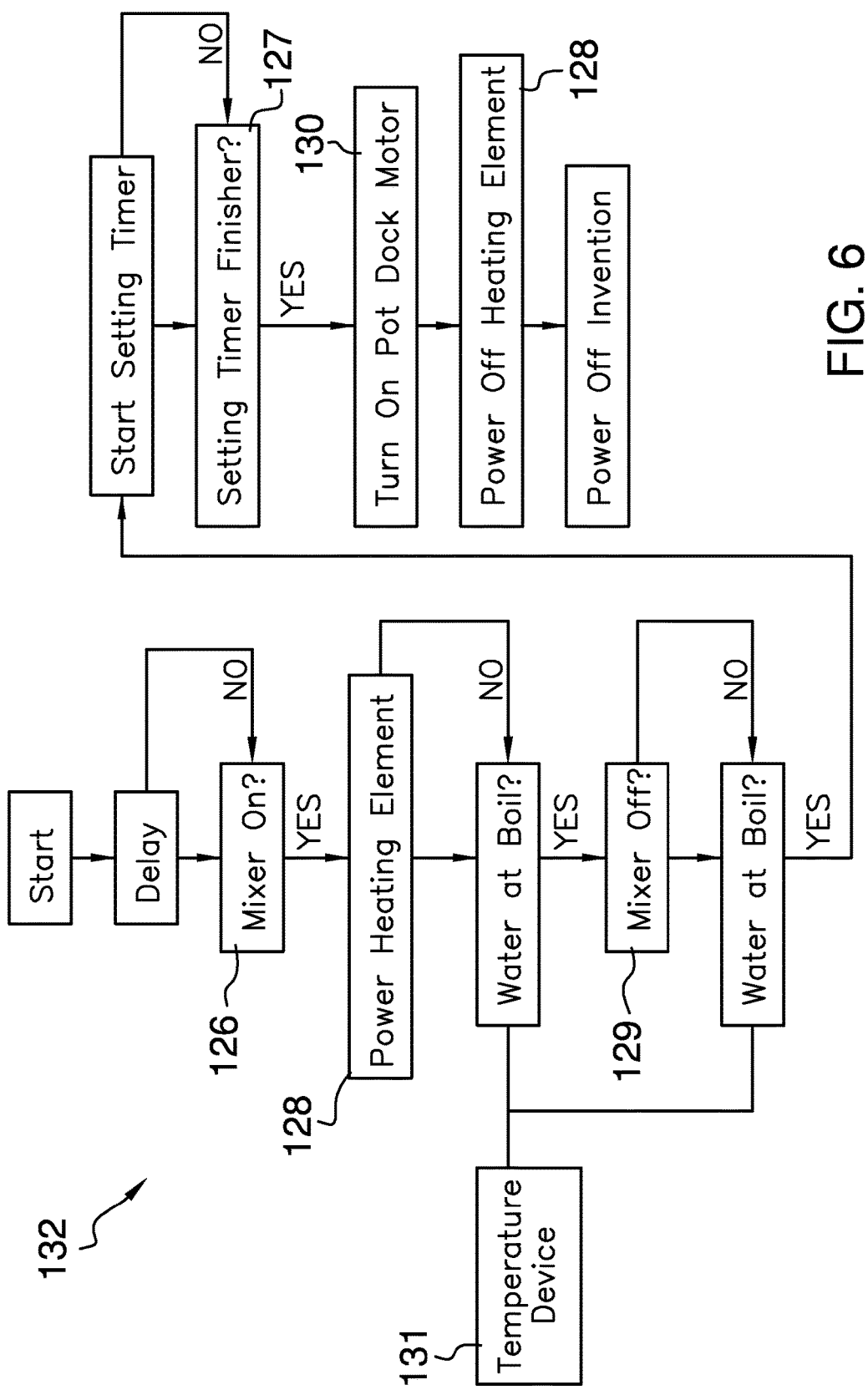
FIG. 6 is a flowchart of an embodiment of the disclosure.
Figure 7:
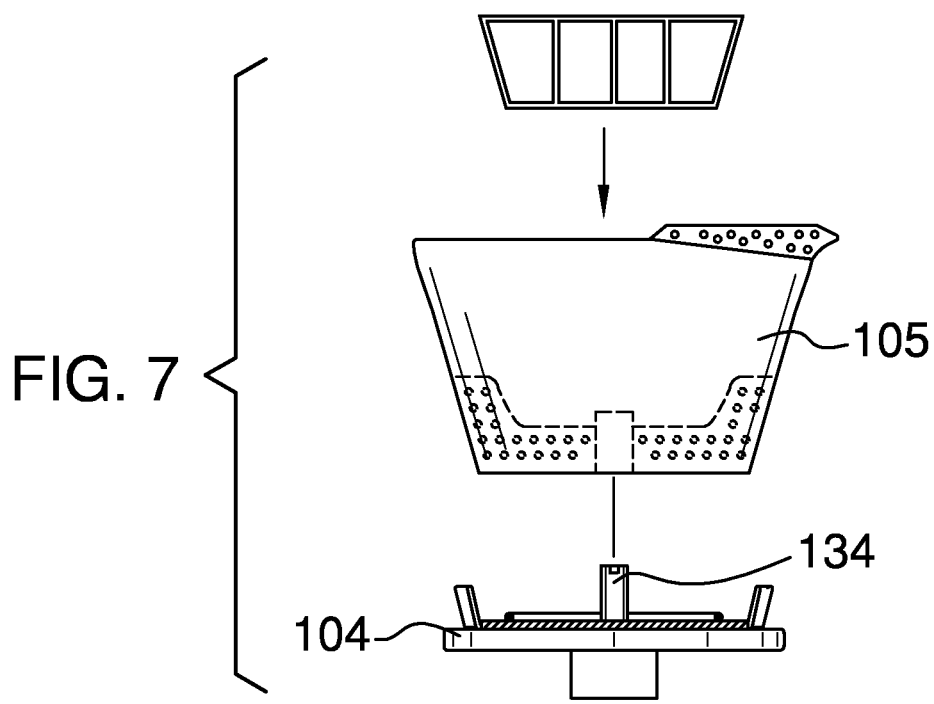
FIG. 7 is a detail view of an embodiment of the disclosure.
Figure 8:
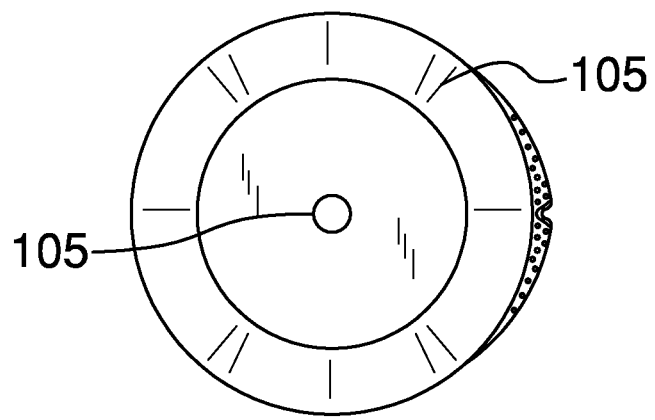
FIG. 8 is an alternate detail view of an embodiment of the disclosure.

In a fourth potential embodiment, as illustrated in FIG. 6, the invention 100 is used and operates as follows. The user places water in the pot 105 and secures the pot 105 in the pot dock 104. The user than places pasta in the hopper 102. The user then plugs in the invention 100 and sets the master timer 126 to the starting time. The invention 100 then monitors the time until the start time. Once the starting time has been reached, the control system 132 closes a heating element 128 switch to apply power to the heating element 128. The control system 132 then monitors the water temperature by monitoring the temperature measurement device 131. Once the temperature measurement device 131 reaches a temperature that indicates the water is boiling, the control system 132 activates the hopper motor 129 which rotates the hopper 102 and dumps the pasta into the pot 105. The control system 132 then monitors the water temperature by monitoring the temperature measurement device 131. Once the temperature measurement device 131 reaches a temperature that indicates the water is boiling, the control system 132 activates the setting timer 127 which begin the measured cooking period. Once the setting timer 127 has finished counting down, the control system 132 turns on the pot dock motor 130 which dumps the water in the pot 105 into the water tray 106. The control system 132 then turns off the heating element 128 and the invention 100.

The logic circuits, control circuits, power circuits and temperature measurement devices necessary to design and operate the invention 100 are well known and documented in the art. The timers, switches, displays, connectors, logic elements and temperature measurement devices necessary to implement the invention 100 are readily available commercially.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A pasta cooking device comprising:
a housing into which a hopper suspends a pot dock;
wherein the pot dock supports a pot thereon;
wherein the pot is able to be heated in order to adaptively cook pasta therein;
wherein the housing also includes a water tray, a hopper motor, a pot dock motor, a control system, and a power cord;
wherein the pot dock comprises a power base, a lock lever, a plurality of stays, a first wing, a second wing, a first bearing, a second bearing, and a pot dock handle.

2. The pasta cooking device according to claim 1 wherein the power base is the platform upon which the pot rests; wherein located in the center of the power base is a power junction that projects perpendicularly upward from the surface of the power base; wherein the power junction provides power to a heating element in the pot; wherein the power junction plugs into a power socket mounted in the bottom face of the pot that provides electricity to the heating element.

3. The pasta cooking device according to claim 2 wherein the first wing is attached to a left side of the power base so that it projects perpendicularly from the power base towards a top face of the housing; wherein the second wing is attached to a right side of the power base so that it projects perpendicularly from the power base towards the top face of the housing; wherein the first wing is fitted with the first bearing and the second wing is fitted with the second bearing.

4. The pasta cooking device according to claim 3 wherein a first support shaft projects perpendicularly out from left side of the housing towards the right side of the housing; wherein a second support shaft projects perpendicularly out from right side of the housing towards the left side of the housing; wherein the first support shaft is inserted through the first bearing; wherein the second support shaft is inserted through the second bearing; wherein the first support shaft and a second support shaft raise the power base off a bottom surface of the housing; wherein the first support shaft and the second support shaft are mounted in the first bearing and the second bearing so that the pot dock can rotate around a pivot point created by the first bearing and the second bearing.

5. The pasta cooking device according to claim wherein the pot dock handle is attached to the right side of the power base; wherein the pot dock handle is fitted through a pot dock slot; wherein the pot dock handle rotates the pot dock around the pivot point to empty the pot should the pot dock motor fail; wherein mounted on a top face of the power base is the lock lever and a plurality of stays; wherein each of a plurality of stays project perpendicularly from the power base towards a top face; wherein the plurality of stays hold the pot in position while the pot dock rotates.

6. The pasta cooking device according to claim 5 wherein the locking lever is a locking mechanism that locks the pot securely into place after the pot is positioned on the pot dock; wherein the plurality of stays is further defined as a visible first stay, a second stay, and a third stay.

7. The pasta cooking device according to claim 6 wherein the pot comprises a container, a colander, the power socket, and the heating element; wherein the container holds the water and pasta while it is being cooked; wherein the bottom of the pot is fitted with the power socket, which receives electricity from the power junction and routes the electricity to the heating element that is installed in a bottom of the container; wherein once electricity is applied to the heating element, the heating element increases temperature, which heats the contents of the container; wherein a top of the container is fitted with the colander; wherein the colander is a curved surface formed with holes; wherein the colander allows water to be drained into the water tray from the container while keeping pasta in the container.

8. The pasta cooking device according to claim 7 wherein the hopper comprises a pasta box, first hopper handle and second hopper handle; wherein the pasta box is a five sided box that holds the pasta until it is ready to be placed in the pot; wherein the pasta box is mounted in two bearings attached to the left side of the housing and the right side of the housing so that it can rotate freely; wherein the first hopper handle is attached to the left side of the pasta box and projects perpendicularly towards the left side of the housing; wherein the second hopper handle is attached to the right side of the pasta box and projects perpendicularly towards the right side of the housing.

9. The pasta cooking device according to claim 8 wherein the first hopper handle is fitted through a first hopper slot and the second hopper handle is fitted through a second hopper slot; wherein the first hopper handle and second hopper handle are used to rotate the hopper around a mounting bearing to empty the pasta box into the pot should the hopper motor fail; wherein the water tray is a chamber that holds the water that is poured out of the pot.

10. The pasta cooking device according to claim 9 wherein the housing comprises a shell, a main door, a hopper door, a first vent, a second vent, the first support shaft, and the second support shaft; wherein the shell is a decorative cover; wherein the main door allows for access to the pot during removal; wherein the hopper door provides access to the hopper so that it can be loaded with pasta; wherein the first vent and the second vent allow for water vapor and heat to escape; wherein the right side of the housing is formed with the pot dock slot.

11. The pasta cooking device according to claim 10 wherein the pot dock slot is a slot formed in the shape of a partial circle of 270 degrees arc; wherein the pot dock slot provides access to the pot dock; wherein the first hopper slot is formed in the left side of the housing and the second hopper slot is formed on the right side of the housing.

12. The pasta cooking device according to claim 11 wherein the dock rotation motor is connected to a chain that rotates a sprocket in order to rotate the pot dock.

13. The pasta cooking device according to claim 12 wherein adjacent the pasta box, is a water basin; wherein the water basin includes a basin feed tube that extends over top of the pot; wherein the basin feed tube is able to dispense water into the pot in order to cook pasta in the pot.

14. The pasta cooking device according to claim 13 wherein the control system comprises a master timer, a setting timer, a hopper motor control, a pot dock motor control, and a temperature measurement device; wherein the master timer sets a start time; wherein the setting timer is used to set a cooking time of the pasta; wherein the temperature measurement device measures the temperature of the water; wherein the hopper motor control is used to rotate the hopper to dump the contents of the hopper into the pot; wherein the pot dock motor control is used to rotate the pot dock to empty the water contained in the pot into the water tray.

* * * * *